United States Patent [19]

Abulhasan

[11] Patent Number: 4,907,539
[45] Date of Patent: Mar. 13, 1990

[54] PET FOOD BOWL AND MAT

[76] Inventor: Fadia N. Abulhasan, 4121 Mt. Atlas La., Haymarket, Va. 22069

[21] Appl. No.: 283,072

[22] Filed: Dec. 12, 1988

[51] Int. Cl.⁴ ............................................. A01K 5/00
[52] U.S. Cl. .................................. 119/52.1; 108/25; 119/61; D6/613
[58] Field of Search ............. 119/61, 52 R; 220/23.8, 220/23.83; 206/562, 563; D6/613, 617, 618, 619; 108/25

[56] References Cited

U.S. PATENT DOCUMENTS

| | | | |
|---|---|---|---|
| D. 230,034 | 1/1974 | Goldman | 119/61 |
| D. 264,790 | 6/1982 | Kamel et al. | D6/613 |
| 1,881,416 | 10/1932 | Uhalt | 220/23.8 |
| 2,813,509 | 11/1957 | Bruno | 119/61 |
| 3,469,423 | 3/1972 | Wilton et al. | 108/25 |
| 3,605,769 | 9/1971 | Bagwell | 108/25 |
| 3,722,476 | 3/1973 | Van Neisj et al. | 119/61 |
| 3,752,121 | 8/1973 | Brazzell | 119/1 |
| 3,939,976 | 2/1976 | Van Iseghem, Jr. | D6/617 |
| 4,357,905 | 11/1982 | Carpenter | 119/61 |
| 4,484,529 | 11/1984 | Calderes | D6/618 |

OTHER PUBLICATIONS

Tableware International, p. 37, Mar. 1976, Copy in A. J., 291.

Primary Examiner—Paul J. Hirsch

[57] ABSTRACT

A combination pet feeder consisting of a divided food and water bowl centered and anchored on a flat and colorful rubber mat. The mat catches all spillages while dog feeds. The bowl stays in position at all times.

1 Claim, 1 Drawing Sheet

PET FOOD BOWL AND MAT

BACKGROUND OF THE INVENTION

This invention pertains to a food and water bowl that could eliminate messy floors while dog eats.

Unlike other pet feeding dishes, the invention is a combination food/water dish that is centered and anchored on a flat rubber mat. The bowl will not tip or move while dog eats. The rubber mat, because of its sufficient size, catches excess spillage.

The whimsical design of graphics on mat will make it very attractive to the eye.

SUMMARY OF THE INVENTION

The invention consists of a round, divided food and water bowl combination that is centered and anchored on a flat colorful mat.

The bowl will not be easily tipped or moved while dog feeds. All excess spillage will remain on the mat.

The removable bowl and rubber mat can be easily cleaned and stored.

The bowl-mat set has ingrained pictures on four sides of the mat consisting of: place mat, plate with bone and serving utensils, resembling a table setting for dogs, that is.

DESCRIPTION OF THE PREFERRED EMBODIMENTS

Figure 1:
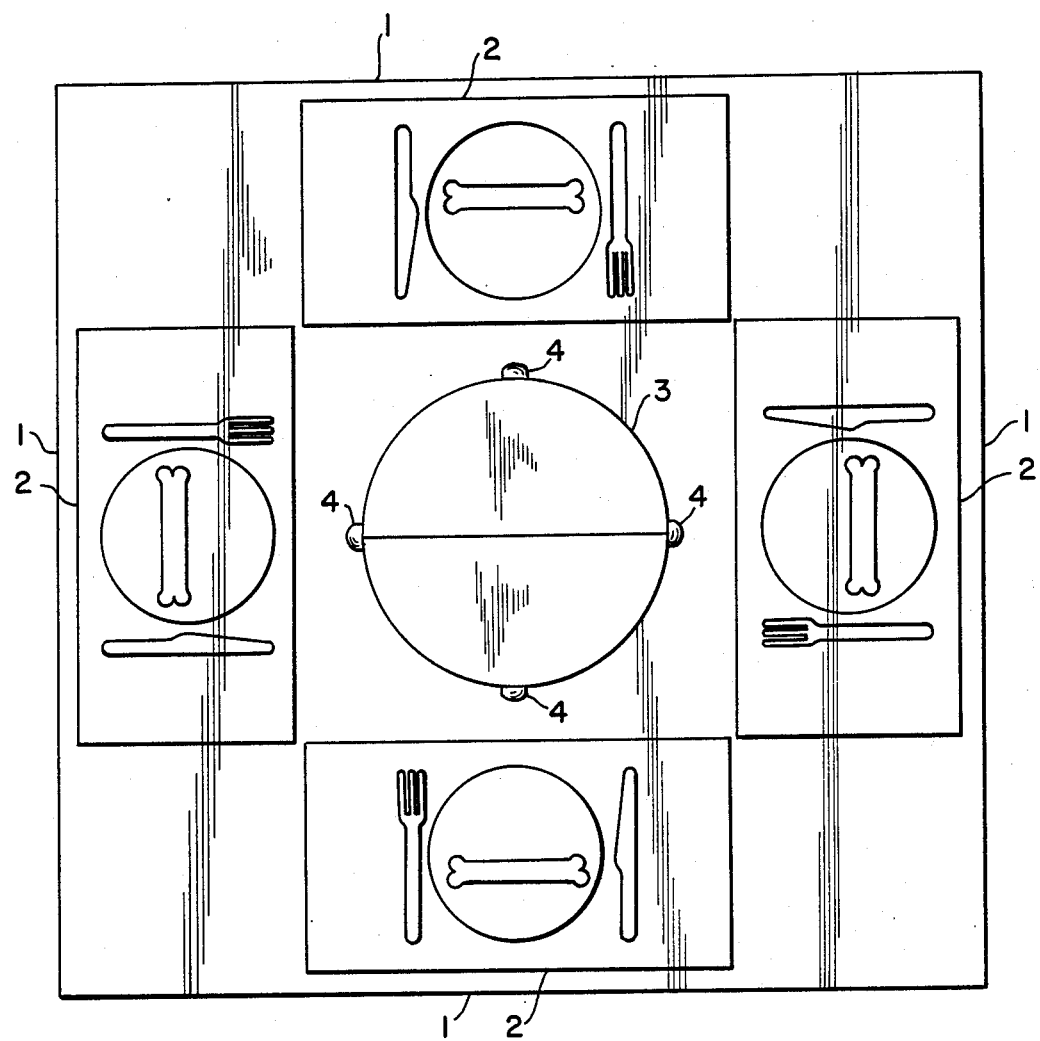
FIG. 1 is a plan view of the bowl-mat set.
Figure 2:
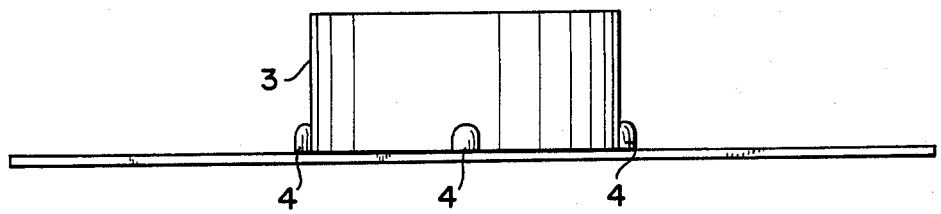
FIG. 2 depicts side view of bowl and said measurements.

The 24"×24" square flat rubber mat (1) has ingrained 11"×6" pictures on four sides of a place mat, plate with bone, and serving utensils (2). In the center is a divided combination food and water bowl 9" dia.×3½" depth (3) anchored and centered by raised rubber notches. (4)

I claim:

1. In combination with a pet feeding receptacle, a flexible floor mat having a central portion, a length and width with at least one side having a graphically depicted plate and utensils, said graphic depiction placed near and along a longitudinal length of said mat, said mat having an integral means for securing the pet receptacle in the central portion of the mat.

* * * * *